A. J. UPHAM.
HARROW.
No. 181,379. Patented Aug. 22, 1876.
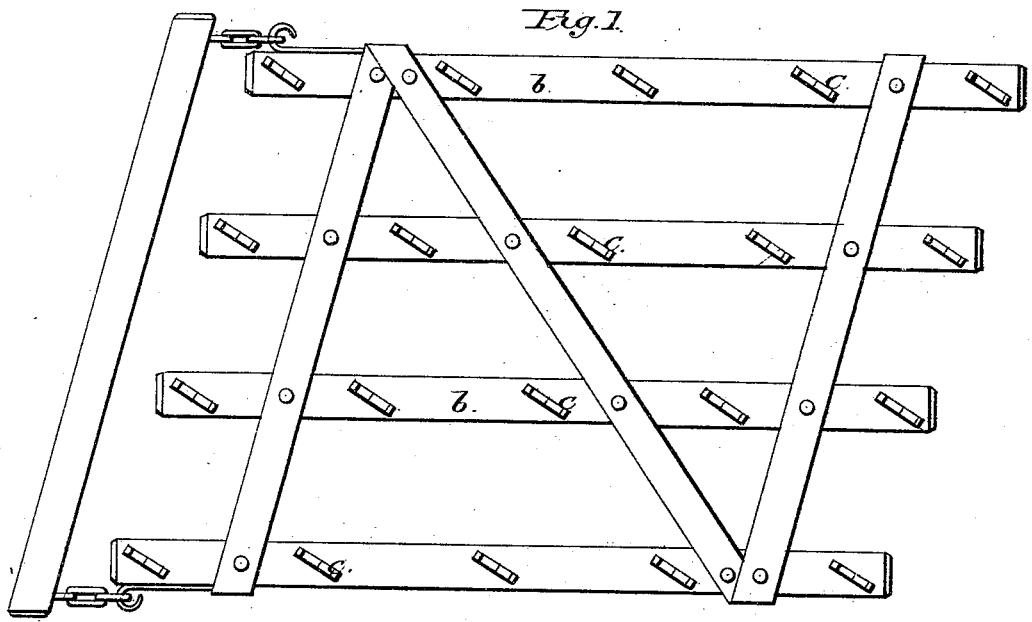
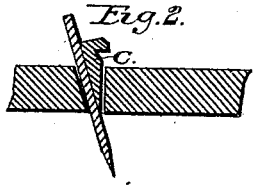
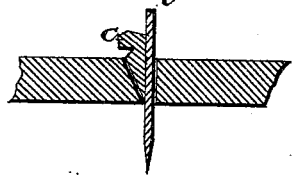
Witnesses:
John W. Alexander
H. C. Ward
Inventor:
Andrew J. Upham

UNITED STATES PATENT OFFICE.

ANDREW J. UPHAM, OF STERLING, ILLINOIS.

IMPROVEMENT IN HARROWS.

Specification forming part of Letters Patent No. 181,379, dated August 22, 1876; application filed November 18, 1875.

*To all whom it may concern:*

Be it known that I, ANDREW J. UPHAM, of the city of Sterling, in the county of Whitesides and State of Illinois, have invented a new and useful Improvement in Harrows, which improvement is fully set forth in the following specification, reference being had to the accompanying drawings.

The object of my invention is to provide a harrow-tooth which may set in the beam either perpendicularly or inclined backwardly below the beam, as may be desired.

Figure 1 is a plan view of a harrow involving my invention. Figs. 2 and 3 are side sectional views of the wedge $c$ and tooth. Fig. 4 is a side view of the tooth and wedge formed in one solid piece.

The beams $b\ b\ b\ b$ are the ordinary beams of a harrow, into which are inserted the teeth, as shown. The harrow is connected to the draw-bar at the outer front corners of the former.

In order to accomplish the change of direction of the teeth, I make the holes into which they are inserted, respectively, elongated at the top of the beam, in the line of draft, nearly the combined width of the tooth and the wedge $c$. These holes laterally are of the width of the teeth. The rear wall of the holes is perpendicular, while the front wall, in passing downward through the beams, approaches the rear wall until, at the lower surface of the beams, the holes are of the precise size of the teeth.

The wedge $c$ is laterally of the same width of the tooth and of the hole. When it is desired to use the tooth in a perpendicular position, the wedge $c$ is placed in front of the tooth, as shown in second beam from the left.

When the slanting tooth is intended to be used, the wedge $c$ is placed in the rear of the tooth, as shown in the right two beams. The wedge is provided on the outside, near the top, with a notch, as a convenience for withdrawing it.

It will be observed the line of draft, and consequent forward movement, is not in the direction of the line of the beams, but rather obliquely across the latter. The holes are made with their elongations in the line of draft, and, as a consequence, the teeth, when slanted, slant back in the direct line of draft. By means of the wedge $c$ the tooth can be fastened, at any desired depth, through the beam.

The tooth and wedge or projection may be made in one piece, as shown at $d$, or the hole may be elongated at the bottom of the beam, and the wedge inserted from below. The tooth $d$ may be made with the wedge adjunct either as shown, or inverted, so that the tooth $d$ may be inserted from the under side of the beam with the same result as to changing the direction of the tooth. And the mode of fastening may be used on a harrow of one or more frames or sections.

The advantage of a slanting tooth in a harrow is well known to those conversant with the subject. In working corn ground in the early stages of the corn-cultivation, in covering grass-seeds, turnip or onion seed, or on any occasion when a light, even stirring of the soil is desired, it is secured by this slant of the teeth.

In the first half of the cultivation of corn this method is becoming almost universally adopted, where known. By the slant of the teeth, not only does the harrow run more steadily, so as to be controllable, but the hills of corn, when passed through, are not torn out. So advantageous, in fact, is this that on some farms a harrow with the teeth driven through the beam obliquely backward is kept alone for corn-cultivation. Also, on ground covered with old corn-stalks, weeds, or stubble, the slanting tooth is used, because of the facility with which it disengages from rubbish, not requiring to be lifted for that purpose.

Of course, the perpendicular tooth, for subduing soddy and rough ground, covering grain, &c., is a necessity on every farm. My invention provides a ready means of converting a straight-tooth harrow into a slanting-tooth one, and vice versa.

I make no claim to the draw-bar or the mode of attaching it to the harrow, nor do I claim the harrow generally; but

I claim as my invention—

1. The beam $b$, provided with the wedge-shaped slots, elongated in the line of draft, in combination with the harrow-tooth $d$, all substantially as described, and for the purpose specified.

2. The solid wedge-shaped harrow-tooth $d$, constructed and operating as and for the purpose specified.

ANDREW J. UPHAM.

Witnesses:
JOHN W. ALEXANDER,
H. C. WARD.